No. 757,637. PATENTED APR. 19, 1904.
J. H. REID.
GAS BATTERY.
APPLICATION FILED AUG. 3, 1903.
NO MODEL. 2 SHEETS—SHEET 1.

Witnesses
Chas. K. Davies.
M. E. Brown.

Inventor
J. H. Reid
by W. H. Bartlett
Attorney

No. 757,637. PATENTED APR. 19, 1904.
J. H. REID.
GAS BATTERY.
APPLICATION FILED AUG. 3, 1903.
NO MODEL. 2 SHEETS—SHEET 2.

Witnesses
Chas. K. Davis.
M. E. Brown.

Inventor
J. H. Reid
by W. H. Bartlett
Attorney

No. 757,637.

Patented April 19, 1904.

UNITED STATES PATENT OFFICE.

JAMES H. REID, OF NEWARK, NEW JERSEY.

GAS-BATTERY.

SPECIFICATION forming part of Letters Patent No. 757,637, dated April 19, 1904.

Application filed August 3, 1903. Serial No. 168,028. (No model.)

*To all whom it may concern:*

Be it known that I, JAMES H. REID, a citizen of the United States, residing at Newark, in the county of Essex and State of New Jersey, have invented certain new and useful Improvements in Gas-Batteries, of which the following is a specification.

This invention relates to gas-batteries in which a fluid electrolyte is used.

The object of the invention is to produce a gas-battery in which a circulation of a liquid electrolyte may be obtained and in which the bubbles in the electrolyte formed by the action of the gas or gases in the development of the electric current may be broken up and the inert gases allowed to escape.

Figure 1:
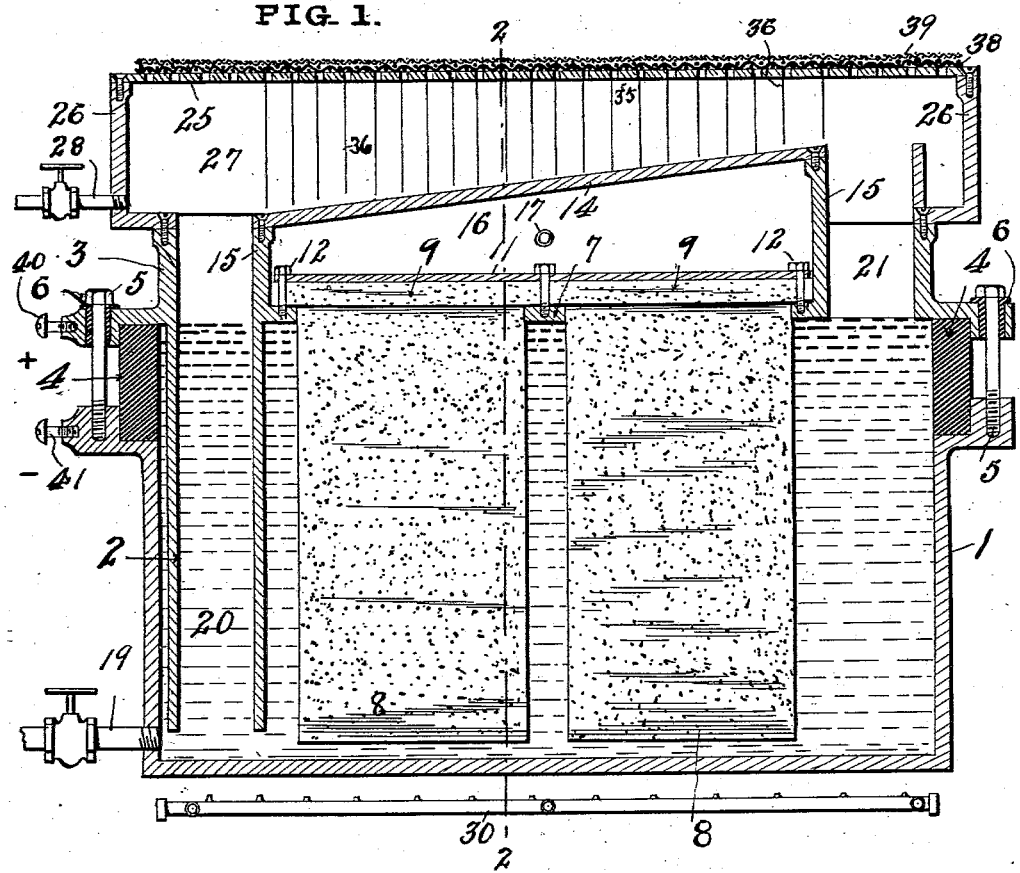
Figure 3:
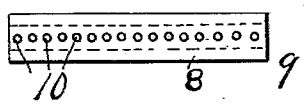
Figure 6:
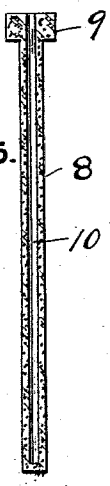
Figure 2:
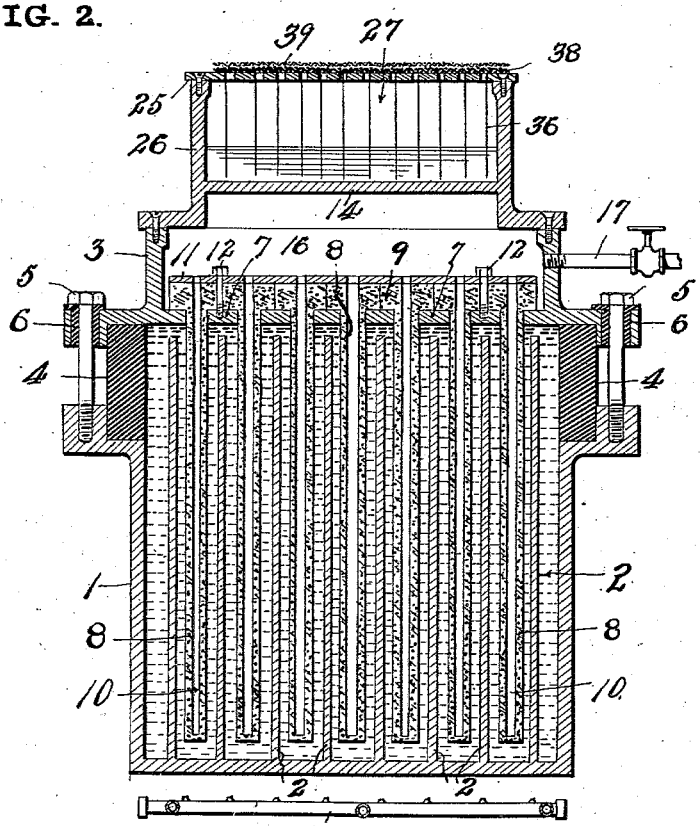
Figure 4:
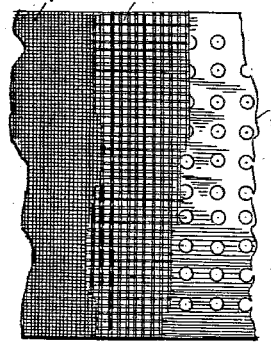
Figure 5:
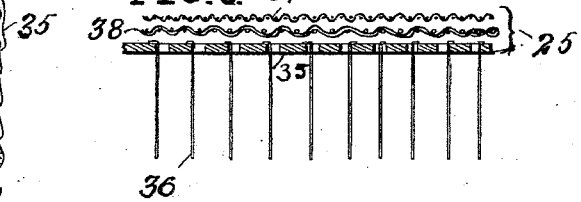

Figure 1 is a longitudinal section of a battery embodying my present invention. Fig. 2 is a cross-section of same. Fig. 3 is a plan of the porous electrode. Fig. 4 is a broken plan of perforated cover. Fig. 5 is an enlarged detail section of cover and pendent wires. Fig. 6 is a vertical section of porous electrode.

The numeral 1 indicates a metallic pot or vessel, preferably rectangular in form, and inside this vessel there are a number of longitudinal partitions 2 2, which divide the vessel into compartments. The vessel 1 has a metallic extension 3, which is separated from the vessel proper by insulating-strips 4, and bolts 5, which secure the extension or annex to the vessel, pass through insulators 6, so that the extension 3 is insulated from vessel 1. The extension 3 has longitudinal slits forming a grid or grating, the bars 7 of which are above the partitions 2. The electrolyte extends above partitions 2. Between the bars 7 I insert porous electrodes 8. These electrodes are of a material which is pervious to gases, but impervious to the liquid electrolyte which I employ, which is preferably the hydrate of sodium or potassium kept fluid by heat and at a temperature approximating 400° Fahrenheit.

The electrodes 8 of the present invention are preferably rectangular bodies of porous carbon thin enough to pass between bars 7 and partitions 2, except that these carbon electrodes have heads 9, which lie on bars 7. The electrodes 8 have holes or passages 10 bored from the top nearly to the bottom. As the heads 9 overlap bars 7, they are secured thereto by stay-pieces 11 and bolts 12, passing through the stay-pieces or binders and into the bars 7. The heads of two electrodes overlap each bar 7. The electrodes are far enough from partition 2 to permit a body of the electrolyte to stand between.

Above the electrodes 8 there is an inclined flooring 14, of metal, supported on risers 15 from extension 3. This flooring covers gas-chamber 16, which extends above all the electrodes 8. A gas-supply pipe 17 serves for the introduction of gas into said chamber, and from this chamber the gas may pass down all the tubes or passages 10 in the electrodes 8.

At one end of the vessel 1 there is a draw-off pipe 19, having a suitable valve. A down pipe or passage 20 leads nearly to the bottom of vessel 1 near one end, and an uppassage or outflow 21 extends above the higher end of flooring 14.

A cover 25 is attached to upward-projecting sides 26 and extends above the flooring 14, forming with sides 26 a chamber 27 over said flooring. The chamber 27 receives at one end an air or air and steam or water supply from pipe 28. The air or steam supplies oxygen to the electrolyte, which surrounds the electrodes 8. The air-passage 20 conducts air or oxygen from pipe 28 downward into the electrolyte, and the electrolyte, heated by any suitable heater 30, froths and bubbles up the passage 21 when the battery is in operation. The bubbles and froth flow down the inclined flooring, and the liquid returns down passage 20.

The cover 25 is perforated, but does not permit an escape of the electrolyte from chamber 27. I prefer to make cover 25 as follows: A lower plate 35 has fine holes therein, bored closely together. Suspended from this plate are fine wires 36, extending pretty nearly down to cover 14. When the froth and bubbles flow down the inclined floor 14, these wires are struck by the bubbles, and being put in vibration they break the bubbles and permit the escape of gases confined therein. The wires 36 are quite numerous and are secured to plate 35 in any suitable way, as by passing through some of the holes in said plate, or they may be otherwise suspended. Above plate 35 I arrange a layer of wire-gauze 38, and above this a layer of still finer gauze 39. Of course other material might be substituted which permits the passage of gas, but not too freely.

One of the battery-wires is connected to the binding-post 40, which is insulated from the vessel 1 and connected by electrical conductors with all the electrodes 8. The other battery-wire connects to binding-post 41, which is attached to vessel 1.

The operation is as follows: The electrolyte is introduced into vessel 1 and surrounds the porous electrodes 8 in said vessel. The partitions 2 in the vessel are close to said electrodes and serve as conductors for electricity. Air is forced into the electrolyte near one end, and some circulation of the liquid electrolyte takes place when the battery is in use. A combustible gas is introduced under more or less pressure into chamber 16 and so into the porous electrodes. The gas passes into or through the porous material, presumably in a finely divided or diffused state and probably unites with the oxygen of the electrolyte, either in the pores of the porous electrodes or close to the porous electrodes. Air may be introduced with the gas, so as to pass into the electrodes, and in such case no other air-supply is needed. The porous electrodes are thus connected to energize one battery element, and the vessel and partitions form connections for the other battery element. The oxygen fed in permeates the electrolyte to a greater or lesser extent. Circulation is induced, probably by chemical action. The electrolyte bubbles and froths over the flooring 14, and the bubbles encountering the wires 36 are broken, leaving the liquid to flow down the inclined floor. Carbonic-acid gas and possibly other waste gases released from the bubbles and froth pass off through the cover, which restrains and retains the electrolyte.

What I claim is—

1. In a gas-battery, an electrolyte and means for retaining the same in fluid condition by heat, a passage for the circulation of said electrolyte and wires extending into said passage in position to interrupt the passage of bubbles.

2. In a gas-battery, an electrolyte, a circulating-passage for the same, and mechanical means to interrupt the bubbles in said passage.

3. In a gas-battery, a containing vessel, a circulating-passage connected therewith and having an inclined floor, and pendent wires extending nearly to the floor, all combined.

4. In a gas-battery, the combination of a containing vessel having a grid-covering, a series of porous electrodes extending through the grid, and electrical connections from the vessel and from the porous electrodes, forming battery-terminals.

5. In a gas-battery, the combination of an inclosing metallic vessel and partitions dividing the same, an electrolyte inclosed in the vessel and extending above the partitions, a grating insulated from the vessel and having bars above the partitions and parallel therewith, porous electrodes supported by said grating and extending between the partitions, and means for feeding gas into the porous electrodes.

6. In a gas-battery, the combination of an inclosing vessel a fluid electrolyte, a porous electrode, means for forcing gas into the electrode, and means for circulating an electrolyte around said electrode, and an overflow-chamber provided with means for breaking the bubbles in the electrolyte.

7. The combination of the containing metallic vessel, an insulating-strip at the top thereof, an extension or annex above the insulation, a series of porous carbon electrodes supported by the extension, means for forcing gas into the porous electrodes, and electrical conductors connected respectively to the vessel and to the electrodes.

8. In a gas-battery, the combination of a containing vessel, a fluid electrolyte therein, means for circulating said electrolyte, and a perforate cover adapted to confine the electrolyte while passing a gas.

In testimony whereof I affix my signature in presence of two witnesses.

JAMES H. REID.

Witnesses:
W. A. BARTLETT,
M. E. BROWN.